Nov. 1, 1960  J. HAWKINS  2,958,746
TIRE PRESSURE SIGNAL DEVICE
Filed Dec. 17, 1958  3 Sheets-Sheet 1

Jack Hawkins
INVENTOR.

Nov. 1, 1960
J. HAWKINS
2,958,746
TIRE PRESSURE SIGNAL DEVICE
Filed Dec. 17, 1958
3 Sheets-Sheet 2
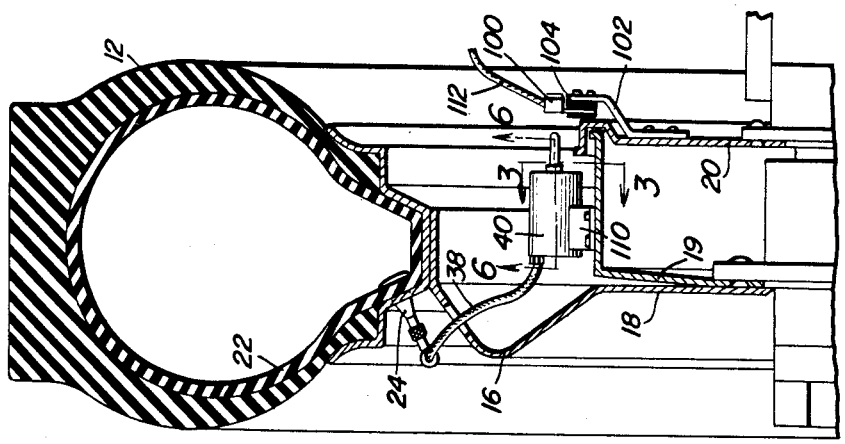
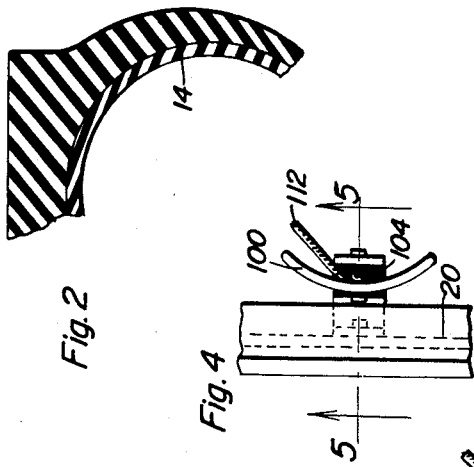
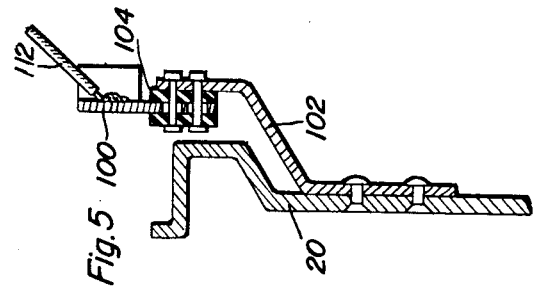
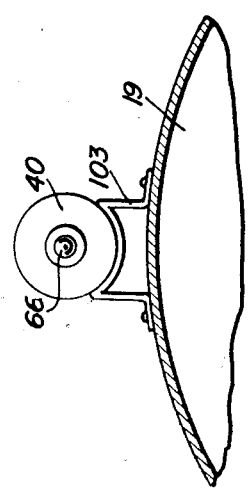
Jack Hawkins
INVENTOR.
BY Clarence A. O'Brien
and Harvey B. Jacobson
Attorneys

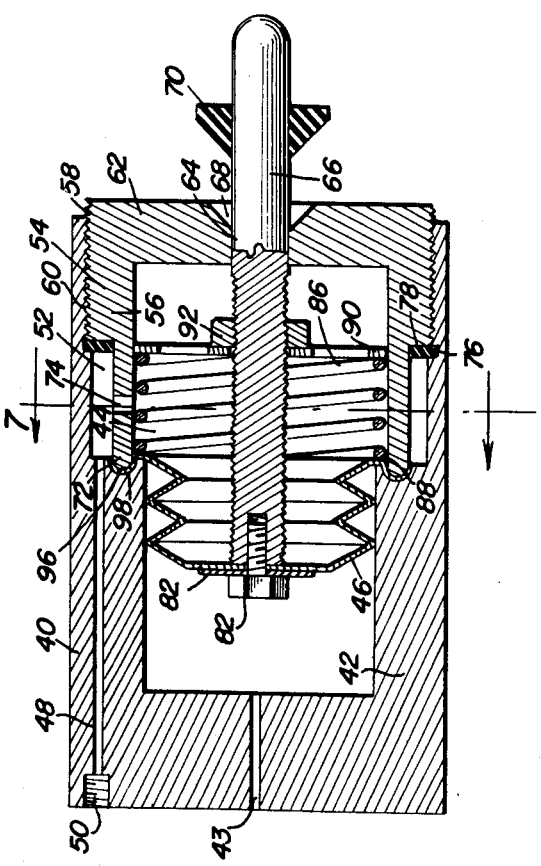

United States Patent Office 2,958,746
Patented Nov. 1, 1960

2,958,746

TIRE PRESSURE SIGNAL DEVICE

Jack Hawkins, Sylacauga, Ala. (P.O. Box 481, Ringgold, Ga.), assignor of forty percent to George E. Swicegood, Ringgold, Ga.

Filed Dec. 17, 1958, Ser. No. 781,015

5 Claims. (Cl. 200—61.25)

This invention relates to safety devices and more particularly to an automatic signal device which provides a signal when a tire on a motor vehicle loses pressure.

An object of the invention is to provide a signal device which automatically provides a signal, for instance a flashing light at such time that the correct pressure in a tire, especially one or both of the tires on a dual wheel, falls below a predetermined pressure level. With such a signal, the vehicle operator may make proper repairs or adjustments before serious damage results.

A more specific object of the invention is to provide a unit adapted to be fastened to the wheel, brake drum, or some other part of a motor vehicle wheeled assembly and which connects the tire inner tube inflation stem so as to sense the pressure in the tire at all times. The unit is preferably constructed of a diaphragm, for instance a bellows-type diaphragm, that constitutes the movable wall of the pressure chamber. The pressure chamber is exposed to the tire pressure, and there is an axially movable rod attached to the diaphragm and held retracted within the unit housing by the pressure in the chamber of the housing. When the pressure is reduced beyond a predetermined safe operating level, the spring in the pressure chamber and reacting on the rod pushes the rod to an extended position from the housing. The rod in its extended position strikes a comparatively fixed contact, and each time that the rod touches the contact an electrical circuit is completed. This electric circuit has a signal in it, for instance an electric lamp, which is intermittently energized each time that the rod touches the stationary contact. With the lamps arranged in the instrument panel or on an auxiliary panel in the cabin of the motor vehicle and identified as to wheel, the vehicle operator may notice at a glance, the unsafe condition of the tire and will be able to immediately detect which tire is faulty.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is an enlarged transverse fragmentary sectional view of one of the dual wheels of the vehicle.

Figure 3 is a sectional view on an enlarged scale and taken on the line 3—3 of Figure 2.

Figure 4 is a fragmentary elevational view showing the stationary contact.

Figure 5 is an enlarged sectional view taken on the line 5—5 of Figure 4.

Figure 6 is an enlarged sectional view taken on the line 6—6 of Figure 2.

Figure 7 is a transverse sectional view taken on the line 7—7 of Figure 6.

Figure 8 is an enlarged sectional view of a fitting adapted to connect to the inflation stem of a vehicle inner tube and with which the pressure sensing unit is connected.

Figure 9 is an elevational view of a typical panel on which the signal lamps are located.

Figures 1, 10:
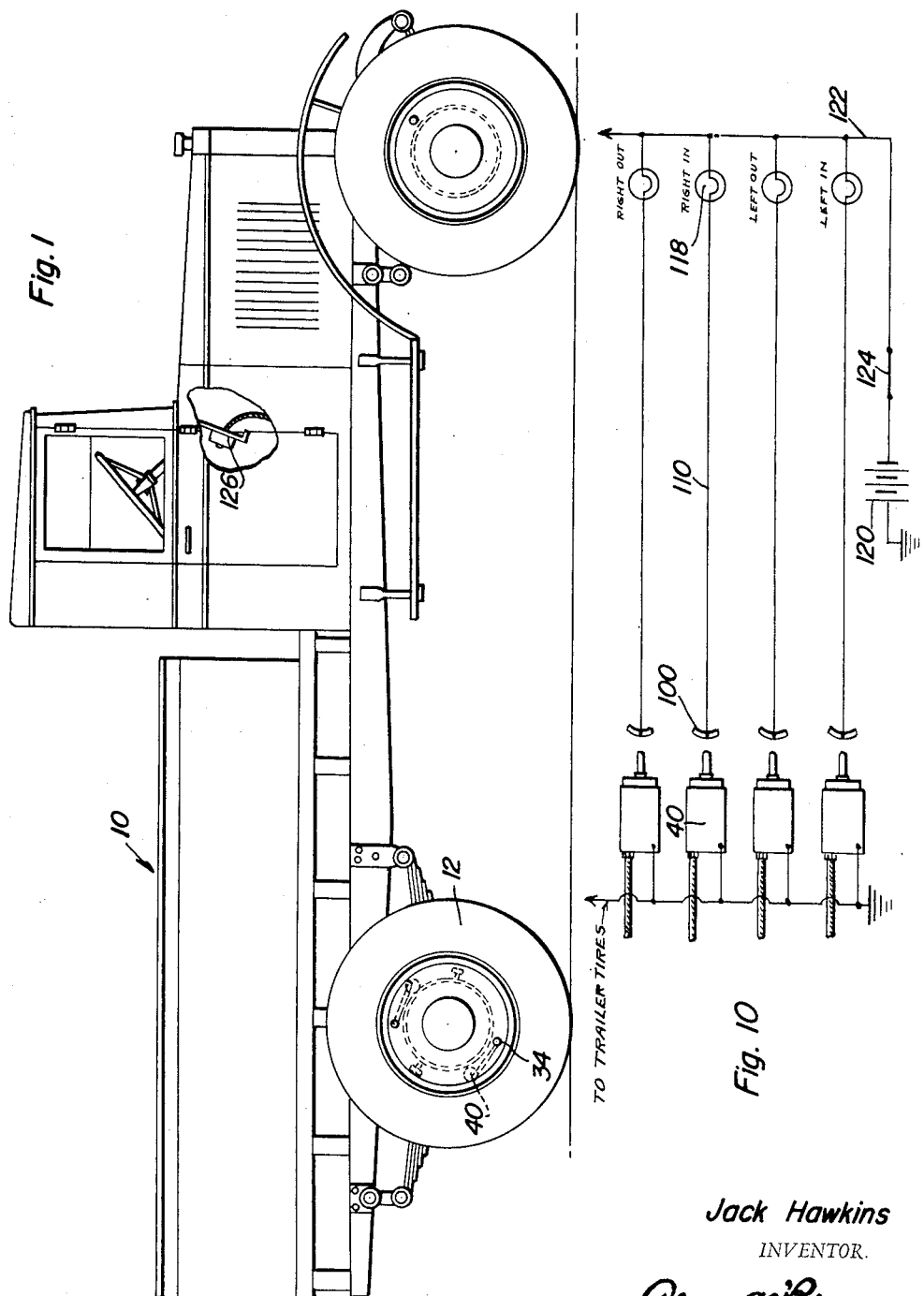
Figure 1 is a side view of a motor vehicle which diagrammatically represents any type of motor vehicle having tires.
Figure 10 is a diagrammatic view showing the wiring of a portion of one of the safety systems that would be installed on a motor vehicle.

In the accompanying drawings there is a motor vehicle 10 diagrammatically representing any type of motor vehicle which has tires, for instance tires 12 and 14 on dual wheel 16. Even though the invention has its principal application in connection with the dual wheels of a motor vehicle, it may be used on single wheels as well.

Wheel 16 is part of a wheel assembly 18 having a rotating part, for example brake drum 19. A stationary part of the wheel assembly is backing plate 20 located adjacent to the brake drum. There are other parts appertinent to the wheel assembly, although they do not enter directly into the invention and an understanding thereof. Tire 12 has an inner tube 22 and an inflation stem 24 connected therewith.

In Figure 8 the inflation stem 24 is shown with a fitting 26 connected to it. The fitting is a T with one part 28 thereof connected to the inflation stem. The cross part 30 of the T-fitting has valve core 32 therein and a valve cap 34 over the valve core. This end of part 30 of the T-fitting is used for applying air under pressure into the inner tube of the tire. A T-shaped passage 36 connects the parts 28 and 30 of the fitting for free flow of air within the fitting.

A flexible hose 38 is connected by coupling 39 to one end of the part 30 of the T-fitting and is, therefore, exposed to the pressure in the inner tube of the tire. Hose 38 is attached to unit 40 (Figures 6 and 7) to conduct the air under pressure thereto. The unit is made of a housing 42 having an internal chamber 44 with vent 43 and divided by diaphragm 46, the latter preferably being a bellows-type diaphragm. There is a passageway 48 in one of the walls of the housing and it registers with a tapped opening 50 within which the end of hose 38 is secured. Accordingly, air under pressure passes through passageway 48 and through the annular recess 52 formed at one end of the cylindrical housing 42. Cap 54 is attached to the cylindrical housing by being formed with a cylindrical skirt 56 having external threads 58 which engage the internal threads 60 at the open end of the housing 42. The cap has a transverse wall 62 provided with a central opening 64 through which rod 66 is passed. There is a seat 68 at the outer extremity of opening 64 in which valve member 70 is disposed when the rod 66 is in the retracted position. Accordingly, valve member 70 is secured rigidly to rod 66.

Skirt 56 has a reduced inner extremity 72 that fits in housing 42 and that is spaced from the adjacent part of the side wall of the housing in an annular fashion in order to form circumferential recess 52 that is registered with passage 48. One or more openings 74 are provided in the reduced part 72 of the skirt 56 in order to communicate annular recess 52 with chamber 44 and thereby admit air under pressure into chamber 44. Seals, for instance gaskets 76 between shoulders 78 on skirt 46 and a shoulder surface of housing 42 are used wherever found necessary for the containment of the air under pressure.

Diaphragm 46 is attached at its central part to the inner extremity of the threaded rod 66. Bolt 80 passing through a hole in washer 82 and threaded into a tapped central bore in rod 66 may be used for this purpose. Resilient means for extending the rod 56 when the pressure in chamber 44 is reduced below a predetermined level, are provided within chamber 44. These resilient means are composed of a spring 86 which seats at one end on a shoulder 88 formed by a part of diaphragm 46 which seats on a surface of the housing 42. The opposite end of spring 86 is disposed on an apertured washer 90 which abuts nut 92 adjustably disposed on the threaded part of rod 66. By adjusting nut 98 axially on rod 66 the position of the apertured washer 90 is adjusted with respect to spring 86 thereby adjusting the compression in the spring. This is how the unit is made to respond to different pressure levels. The diaphragm 46 is rigidly secured in the housing by having its peripheral part 96 disposed in annular groove 98 formed in a part of the shoulder against which the shoulder portion 88 of diaphragm 46 seats. The inner extremity of the reduced part 72 of skirt 56 fits in the annular groove 98 thereby compressing the peripheral part of the diaphragm and clamping it in place.

In use of the unit 40 air under pressure enters the chamber 44 in the manner described previously. The pressure reacts on the diaphragm 46, pushing it in the direction to withdraw rod 66. Since the area of the diaphragm is greater than the cross-sectional area of rod 66, the direction of movement of the diaphragm will be to retract the rod 66 that is, to the left in Figure 6. This compresses spring 86 that yieldingly opposes the inward movement of the rod 66. However, when the pressure in chamber 44 becomes reduced beyond the level set by adjusting nut 92, the spring 86 overcomes the reduced pressure and extends rod 66 outwardly of the unit 40.

When the rod is extended outwardly it is in a position to touch the contact 100. The contact 100 is preferably an arcuate plate mounted stationarily in the wheel assembly, for instance by being fastened to bracket 102 that is secured to back plate 20. Insulating washers or an insulating plate 104 is disposed between the curved contact plate 100 and the bracket 102 thereby insulating the contacts from all parts of the wheel assembly. However, unit 40 is grounded to the wheel assembly by being secured to a rotating part of the wheel assembly by metal mounting brackets 110 (Figure 2).

There are signals operatively connected in the system. The mounting bracket 102 has a conductor 112 attached to it, for example, by being soldered, attached to a binding post, riveted or otherwise fastened in place. This conductor 112 is connected with a socket in which there is a signal lamp 118 (Figure 10). A source of electrical potential, for instance, battery 120 in the motor vehicle, is used to energize lamp 118. Therefore a conductor 122 extends from one side of the source 120 to the socket containing lamp 118. Switch 124 for the entire system is in conductor 122. One side of the battery 120 is shown grounded, and unit 40 is also grounded. Therefore, each time that rod 66 touches contact 100, lamp 118 will be energized.

As shown in Figure 9 the instrument panel of the motor vehicle or an auxiliary panel 126 has lamp 118 and a number of other lamps thereon. Each lamp is identified as to tire location. The panel 126 is arranged for a tractor-trailer where the tractor has two dual wheels and the trailer has four dual wheels, each provided with a signal device, the same as described in connection with the right inside wheel of truck 10. Figure 10 shows that each of the units for a typical motor vehicle are connected to ground and each has its separate contacts equivalent to contacts 100 and separate signal lights. Each of the signal lights are connected to the positive side of the battery in motor vehicles where the negative side of the battery is grounded. In motor vehicles where the positive side of the battery is grounded, the system may be made reverse, this being an obvious interchange.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A signal device for indicating a low pressure condition of a tire, said device comprising a pressure sensing unit having a housing provided with a perssure chamber, a rod in said chamber, a flexible diaphragm attached to one end of said rod and extending across said chamber, means including an air conductor for applying pressure to said chamber and on one face of said flexible diaphragm and in a direction to withdraw said rod, resilient means adjustably connected with and reacting on said rod for yieldingly urging said rod in the opposite direction and to extend said rod from said chamber when the pressure in said chamber becomes reduced, said housing having an open end, a cap secured to the open end of said housing, the edge portion of said diaphragm interposed between said housing and said cap and held clamped therebetween.

2. A signal device for indicating a low pressure condition of a tire, said device comprising a pressure sensing unit having a housing provided with a pressure chamber, a rod in said chamber, a flexible diaphragm attached to one end of said rod and extending across said chamber, means including an air conductor for applying pressure to said chamber and on one face of said flexible diaphragm and in a direction to withdraw said rod, resilient means adjustably connected with and reacting on said rod for yieldingly urging said rod in the opposite direction and to extend said rod from said chamber when the pressure in said chamber becomes reduced, said housing having an open end, a cap secured to the open end of said housing, the edge portion of said diaphragm interposed between said housing and said cap and held clamped therebetween, said pressure conducting means including a recess in said housing, said housing having a port communicating said recess with said chamber.

3. A signal device for indicating a low pressure condition of a tire, said device comprising a pressure sensing unit having a housing provided with a pressure chamber, a rod in said chamber, a flexible diaphragm attached to one end of said rod and extending across said chamber, means including an air conductor for applying pressure to said chamber and on one face of said flexible diaphrgam and in a direction to withdraw said rod, resilient means adjustably connected with and reacting on said rod for yieldingly urging said rod in the opposite direction and to extend said rod from said chamber when the pressure in said chamber becomes reduced, said housing having an open end, a cap secured to the open end of said housing, the edge portion of said diaphragm interposed between said housing and said cap and held clamped therebetween, said pressure conducting means including a recess in said housing, said housing having a port communicating said recess with said chamber, an adjustably supported resilient means retaining member on said rod and located in said chamber and adapted to be adjustably positioned lengthwise of said rod to thereby adjust the effectiveness of said resilient means.

4. The subject matter of claim 3 wherein said diaphragm is in the form of a bellows.

5. The subject matter of claim 3 and a stop secured to said rod on the exterior of said housing to limit the travel of said rod in one direction.

References Cited in the file of this patent

UNITED STATES PATENTS

| | | |
|---|---|---|
| 2,481,864 | Peck | Sept. 13, 1949 |
| 2,740,855 | Welpott et al. | Apr. 3, 1956 |
| 2,790,155 | De Lucia et al. | Apr. 23, 1957 |
| 2,846,664 | Amundsen et al. | Aug. 5, 1958 |